US010183577B2

(12) United States Patent
Pritchard et al.

(10) Patent No.: US 10,183,577 B2
(45) Date of Patent: Jan. 22, 2019

(54) TRANSFER CASE WITH FOUR WHEEL LOCK

(71) Applicant: BorgWarner Inc., Auburn Hills, MI (US)

(72) Inventors: Larry A. Pritchard, Macomb, MI (US); Thaddeus R. Kopp, Jr., Oakland Township, MI (US); Branden L. Reeves, Oxford, MI (US); Philip J. Francis, Lapeer, MI (US); Joseph D. Mastie, Belleville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/431,992

(22) Filed: Feb. 14, 2017

(65) Prior Publication Data

US 2017/0232840 A1    Aug. 17, 2017

Related U.S. Application Data

(60) Provisional application No. 62/295,354, filed on Feb. 15, 2016.

(51) Int. Cl.
*B60K 17/344* (2006.01)
*B60K 23/08* (2006.01)
(Continued)

(52) U.S. Cl.
CPC .......... *B60K 17/344* (2013.01); *B60K 17/342* (2013.01); *B60K 17/35* (2013.01);
(Continued)

(58) Field of Classification Search
CPC ..... B60K 17/344; B60K 23/08; F16H 37/065; F16H 2200/2094; F16H 2200/2064;
(Continued)

(56) References Cited

U.S. PATENT DOCUMENTS 5,980,415 A * 11/1999 Showalter .......... B60K 23/0808
180/247
6,381,530 B1 * 4/2002 Vogt ..................... B60K 17/344
701/67
(Continued)

*Primary Examiner* — Drew J Brown
(74) *Attorney, Agent, or Firm* — Young Basile Hanlon & MacFarlane, P.C.

(57) ABSTRACT

A transfer case includes primary and secondary output shafts, along with a secondary torque transfer mechanism and a locking mechanism, which are configured to selectively couple the primary and secondary output shafts. The secondary torque transfer mechanism comprises a sprocket coupled to the secondary output shaft, and a plate clutch coupled to the sprocket to selectively form a friction coupling with the primary output shaft. The locking mechanism selectively couples the primary output shaft to the sprocket, and includes a locking sleeve and an actuator that moves the locking sleeve between a first position and a second position. In the first position, the locking sleeve forms a first splined connection with the primary output shaft and forms a second splined connection with the sprocket. In the second position, the locking sleeve forms the first splined connection with the primary output shaft and forms a second splined connection with the sprocket.

19 Claims, 8 Drawing Sheets

(51) Int. Cl.
*F16H 63/04* (2006.01)
*F16D 13/52* (2006.01)
*B60K 17/342* (2006.01)
*B60K 17/35* (2006.01)
*F16H 63/30* (2006.01)
*F16D 27/112* (2006.01)
*F16H 3/54* (2006.01)
*F16D 23/12* (2006.01)

(52) U.S. Cl.
CPC .......... *B60K 23/08* (2013.01); *B60K 23/0808* (2013.01); *F16D 13/52* (2013.01); *F16D 27/112* (2013.01); *F16H 63/04* (2013.01); *F16H 63/304* (2013.01); *F16H 63/3026* (2013.01); *B60K 2023/0858* (2013.01); *B60Y 2400/404* (2013.01); *B60Y 2400/421* (2013.01); *B60Y 2400/424* (2013.01); *B60Y 2400/732* (2013.01); *F16D 2023/123* (2013.01); *F16H 3/54* (2013.01); *F16H 2063/3056* (2013.01); *F16H 2063/3093* (2013.01); *F16H 2200/0034* (2013.01); *F16H 2200/2005* (2013.01); *F16H 2200/2035* (2013.01); *F16H 2200/2064* (2013.01); *F16H 2200/2094* (2013.01); *F16H 2200/2097* (2013.01)

(58) Field of Classification Search
CPC ..... F16H 2200/0034; F16H 2200/2097; F16H 2200/2005; F16H 63/04; F16H 3/663; F16H 13/52
See application file for complete search history.

(56) References Cited

U.S. PATENT DOCUMENTS

| | | | |
|---|---|---|---|
| 9,186,987 B2 | 11/2015 | Mastie et al. | |
| 9,447,873 B2 | 9/2016 | Pritchard | |
| 9,772,035 B2* | 9/2017 | Imafuku | F16H 63/304 |
| 2003/0032519 A1* | 2/2003 | Lovatt | F16D 7/027 |
| | | | 475/204 |
| 2004/0162176 A1* | 8/2004 | Foster | B60K 17/3462 |
| | | | 475/210 |
| 2005/0113203 A1* | 5/2005 | Mueller | B60K 17/3467 |
| | | | 475/223 |
| 2005/0215376 A1 | 9/2005 | Williams et al. | |
| 2007/0180940 A1* | 8/2007 | Mizon | B60K 17/3467 |
| | | | 74/330 |
| 2007/0251345 A1* | 11/2007 | Kriebernegg | F16H 61/32 |
| | | | 74/335 |
| 2011/0271781 A1 | 11/2011 | Takaira | |
| 2016/0096429 A1* | 4/2016 | Imafuku | B60K 17/344 |
| | | | 180/233 |
| 2016/0097430 A1* | 4/2016 | Imafuku | F16D 11/04 |
| | | | 192/18 B |
| 2017/0028846 A1* | 2/2017 | Takaira | B60K 17/02 |
| 2017/0037961 A1* | 2/2017 | Pritchard | F16H 61/18 |
| 2017/0087985 A1* | 3/2017 | Imafuku | B60K 17/34 |
| 2017/0113545 A1* | 4/2017 | Imafuku | B60K 23/0808 |
| 2017/0130838 A1* | 5/2017 | Imafuku | F16H 63/304 |
| 2017/0203652 A1* | 7/2017 | Ketchel | B60K 17/02 |

* cited by examiner

TRANSFER CASE WITH FOUR WHEEL LOCK

CROSS-REFERENCE TO RELATED APPLICATION(S)

This application claims priority to and the benefit of U.S. Provisional Application No. 62/295,354, filed Feb. 15, 2016, the entire disclosure of which is hereby incorporated by reference.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

It would be advantageous to provide a transfer case that additionally includes a locking mechanism for positively coupling the primary output shaft and the secondary output shaft for transferring torque therebetween.

SUMMARY

According to an exemplary embodiment, a transfer case includes a primary output shaft and a secondary output shaft. The transfer case also includes a secondary torque transfer mechanism that is configured to selectively couple the secondary output shaft to the primary output shaft to transfer torque therebetween. The secondary torque transfer mechanism comprises a sprocket coupled to the secondary output shaft with a chain, and also includes a plate clutch coupled to the sprocket to selectively form a friction coupling with the primary output shaft. The transfer case also includes a locking mechanism configured to couple the primary output shaft to the sprocket. The locking mechanism includes a locking sleeve and an actuator. The actuator is configured to move the locking sleeve between a first position in which the locking sleeve forms a first splined connection with the primary output shaft and forms a second splined connection with the sprocket to transfer torque between the primary output shaft and the sprocket, and a second position in which the locking sleeve forms the first splined connection with the primary output shaft but is not connected to the sprocket.

The sprocket may include a body and an annular portion extending rearward from the body. The locking sleeve may include an outer portion that selectively forms the second splined connection with the annular portion of the sprocket, and includes an inner portion that non-selectively forms the first splined connection with the primary output shaft.

In another implementation, a transfer case includes a primary shaft, a secondary shaft, and a torque transfer mechanism. The torque transfer mechanism selectively transfers torque from the primary shaft to the secondary shaft. The torque transfer mechanism includes a locking ring, a first sprocket, a second sprocket, and a chain. The first sprocket is selectively coupleable to the primary shaft with the locking ring. The second sprocket is coupled to the secondary shaft. The chain extends between the first sprocket and the second sprocket to transfer torque therebetween. The locking ring includes an annular portion having a first inner periphery that forms a sliding splined connection with the primary shaft. The locking ring also includes an outer annular portion having a second inner periphery that selectively forms another splined connection with the first sprocket.

The first sprocket may include a sprocket body and an annular sprocket portion that extends from the sprocket body and is fixedly coupled thereto to rotate therewith. The locking ring may be selectively movable between a first position in which the locking ring is coupled to the annular sprocket portion and a second position in which the locking ring is not coupled to the annular sprocket portion. The locking ring may additionally include an intermediate portion extending radially outward from the inner annular portion to the outer annular portion. The torque transfer mechanism may include a first actuation system that selectively moves the locking ring between a first position and a second position. The first actuation system may include a linear actuator. The torque transfer mechanism may include a second actuation system having a plate clutch that selectively forms a friction coupling between the first sprocket and the second sprocket.

In another implementation, an actuation system for a transfer case includes a plate clutch and a dog clutch. The plate clutch is configured to selectively couple a primary shaft to a secondary shaft with a friction coupling. The dog clutch is configured to selectively couple the primary shaft to the secondary shaft with a positive coupling. The dog clutch includes an annular member non-selectively coupled to the primary shaft and selectively coupleable to a sprocket to form the positive coupling. The dog clutch may include a locking sleeve having an outer annular portion having an inner periphery that selectively couples to the sprocket and includes an inner annular portion having another inner periphery that is non-selectively coupled to the primary shaft.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
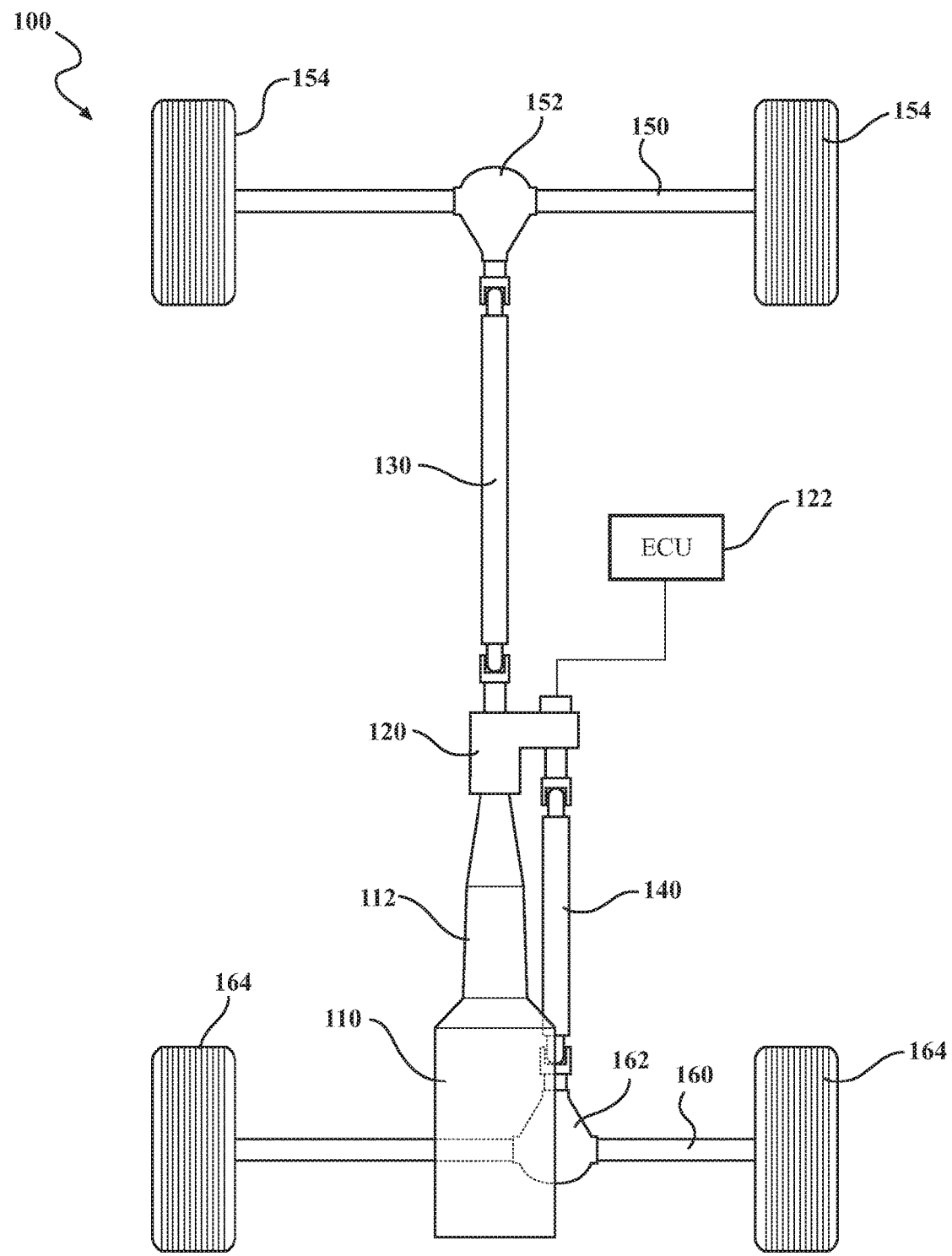
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, wherein the transfer case 120 performs a mode shift between a front-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
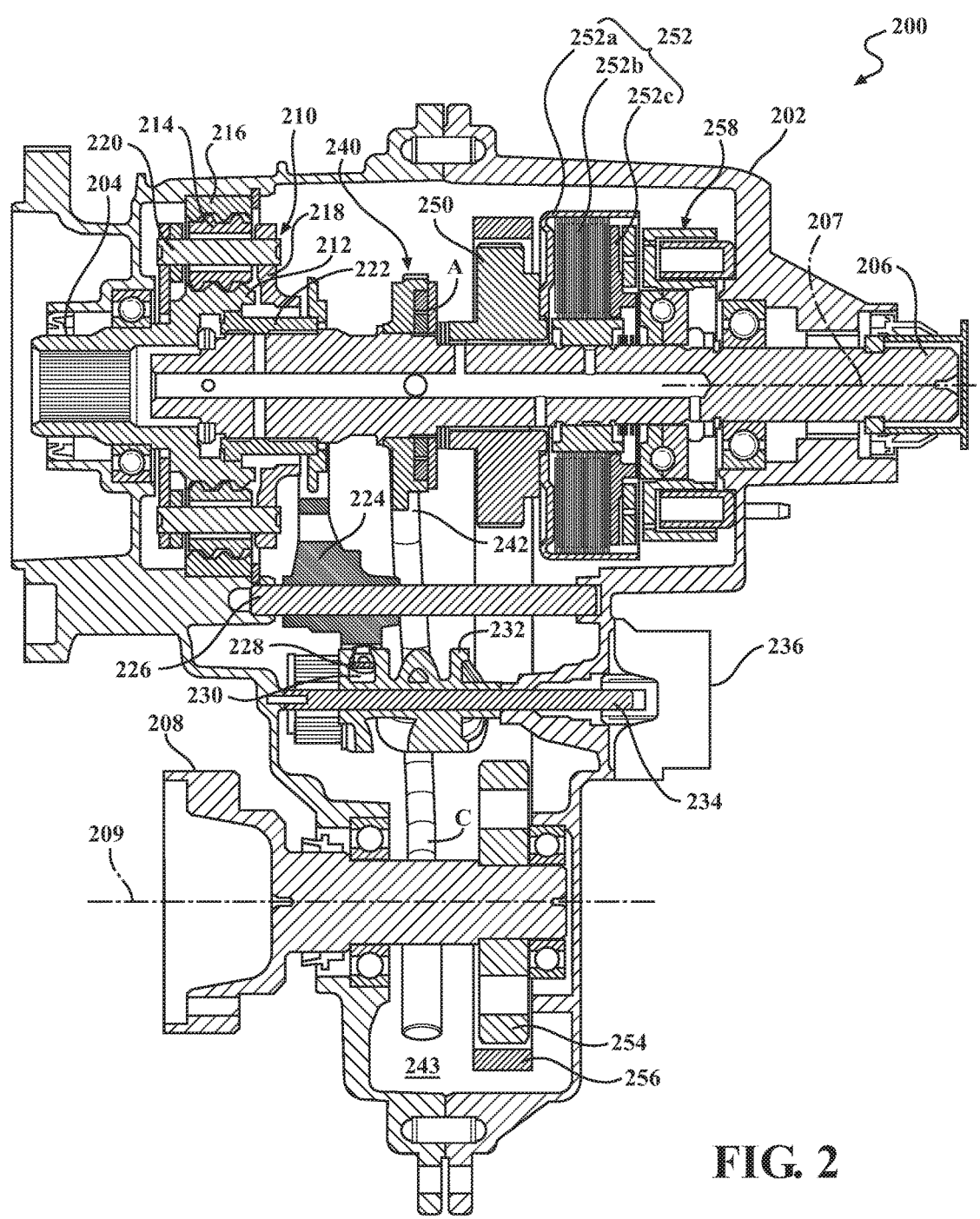
FIG. 2 is a cross-section illustration showing a transfer case having a conventional actuation system.

As shown in FIG. 2, a transfer case 200 generally includes a gear reduction system or mechanism 210 and a secondary torque transfer system or mechanism. The gear reduction mechanism 210 is configured to transfer torque selectively at different drive ratios from an input shaft 204 to a primary output shaft 206 and is operable by a reduction actuation mechanism. The secondary torque transfer system is configured to selectively transfer torque between the primary output shaft 206 (e.g., the rear output shaft or driveshaft 130) and a secondary output shaft 208 (e.g., the front output shaft or driveshaft 140), and is operable by a torque transfer actuation mechanism. In the discussion that follows, directional terminology (e.g., front, forward, back, rearward, etc.), though referring to an orientation in which the transfer case 200 may be installed in a vehicle (e.g., in the cross-sections shown in FIGS. 2 and 3, the left side is the front of the transfer case 200, while the right side is the rear of the transfer case 200), such directional terminology is for reference only, as other mounting orientations of the transfer case 200 and other transfer cases discussed below are possible.

The transfer case 200 includes a housing 202 and rotating components including the input shaft 204, the primary output shaft 206, and the secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position, the gear reduction hub 222 is positioned axially forward (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated be an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. The second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the plate clutch 252 is engaged.

The plate clutch 252 generally includes a housing 252a (e.g., drum), a plurality of interleaved plates 252b, a pressure or apply plate 252c, and an actuator 258. The housing 252a generally includes a radial base through which the primary output shaft 206 extends, and a concentric or annular flange extending axially away from an outer periphery of the base to form the housing 252a, which is generally cylindrical and in which the interleaved plates 252b are positioned. The base of the housing 252a is coupled to the first sprocket 250 to cause rotation thereof, while the apply plate 252c is coupled to the primary output shaft 206 (e.g., through a splined connection) to rotate therewith. The interleaved plates 252b alternate between being engaged (e.g., splined) with the primary output shaft 206 and an inner periphery of the housing 252a. The actuator 258 is configured to press on the apply plate 252c, so as to compress the interleaved plates 252b between the apply plate 252c and the base of the housing 252a, so as to increase friction therebetween and transfer torque between the interleaved plates 252b splined with primary output shaft 206 and the interleaved plates 252b splined with the housing 252a. In this manner, torque may be selectively transferred from the primary output shaft 206 to the first sprocket 250 and ultimately the secondary output shaft 208.

Figure 3:
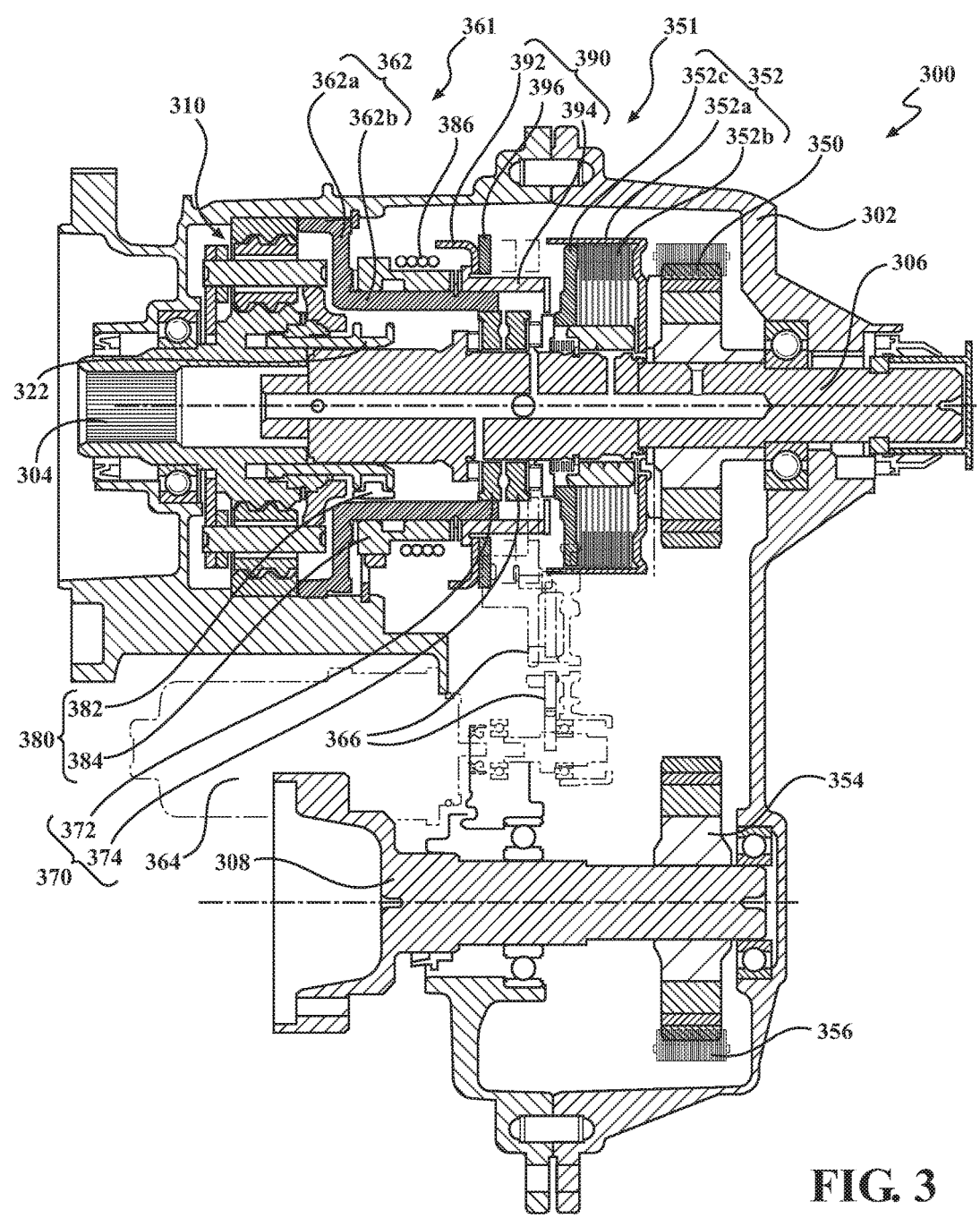
FIG. 3 is a cross-section illustration showing a transfer case having an actuation system according to an exemplary embodiment.
Figure 4:
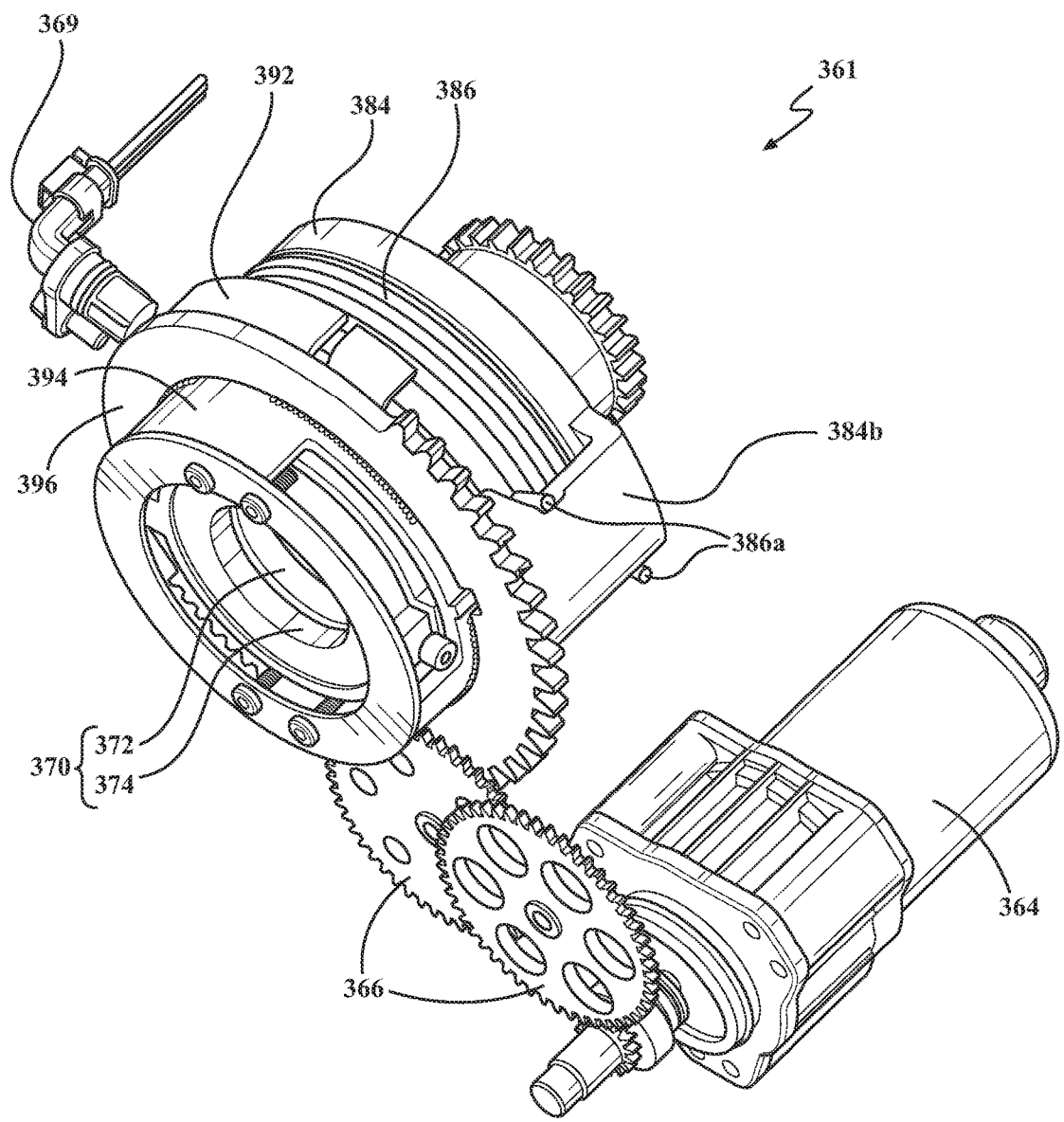
FIG. 4 is a rear perspective view of the actuation system.
Figure 5:
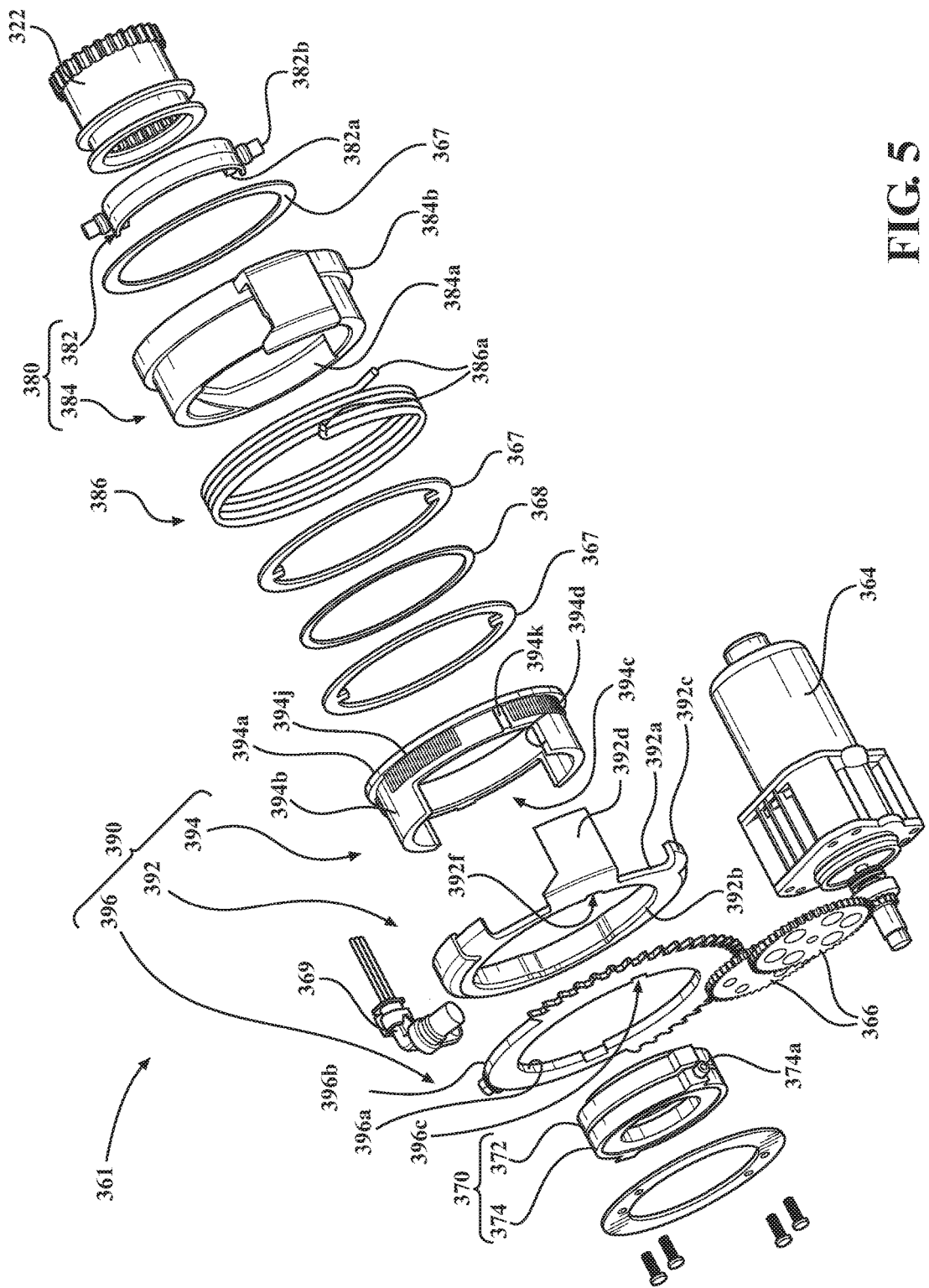
FIG. 5 is an exploded view of the actuation system.

FIG. 3 is a cross-sectional illustration showing the transfer case 300, while FIGS. 4-5 depict an actuation system 361 of the transfer case 300 in isolation. The transfer case 300 generally includes a gear reduction mechanism 310 and a secondary torque transfer mechanism 351, which include similar components (not all shown or labeled in the cross-sectional view of FIG. 3) and functionality of the gear reduction mechanism 210 and secondary torque transfer mechanism discussed previously, along with an actuation system 361 (e.g., actuator or actuation mechanism) that functions to operate both the gear reduction mechanism 310 and the secondary torque transfer mechanism 351. Components and assemblies of the transfer case 300, having generally the same and/or similar function as those of the transfer case 200, are generally described with common naming and numbering increasing by 100 (e.g., gear reduction mechanism 210 and gear reduction mechanism 310) across different embodiments.

As compared to the transfer case 200, the orientation of the plate clutch 352 and sprocket 350 of the secondary torque transfer mechanism 351 are reversed front to rear with the plate clutch 352 having its apply plate 352c facing forward, and the plate clutch 352 itself being disposed forward of the sprocket 350. The actuation system 361 is generally positioned axially between the gear reduction mechanism 310 and the plate clutch 352. The actuation system 361 engages the reduction hub 322 to operate the gear reduction mechanism 310 and is further configured to engage the apply plate 352c of the plate clutch 352 to operate the secondary torque transfer mechanism 351.

As shown in FIGS. 4-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. The actuation system 361 may be considered to be or include a rotary actuator. For example, a first stage is associated with the gear reduction actuator mechanism 380. In the first stage (e.g., first or initial range of motion or rotation; first positive stage and first negative stage), the drive gear assembly 390 is rotated (e.g., +/− between 30 and 50 degrees from center, such as 35 degrees) by the motor 364 via the reduction gears 366 to operate the gear reduction actuator mechanism 380, which moves the gear reduction hub 322 (e.g., coupling) into the first position (e.g., high range at +35 degrees) or the second position (e.g., low range at −35 degrees). In a second stage (e.g., second, continued, or subsequent range of motion or rotation from ends of the first stage; second positive stage, and second negative stage), the drive gear assembly 390 is further rotated (e.g., +/− an additional 10-30 degrees, such as 25 degrees, meaning +35 degrees to +60 degrees and −35 degrees to −60 degrees) by the motor 364 to operate the secondary torque transfer actuator mechanism 370, which presses the clutch apply plate 352c to compress the interleaved plates 352b within the clutch housing 352a. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provided for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

As seen in FIG. 3, the actuator base 362 is a generally rigid, stationary member that fixedly couples the actuator system 361 (e.g., actuation or actuator system or mechanism) to the housing 302 of the transfer case 300. The actuator base 362 generally includes a base portion 362a (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362b (e.g., a radially inner or annular portion or stem), which extends rearward axially away from the base portion 362a toward the plate clutch 352. The actuator base 362 includes a central bore (not labeled) through which the primary output shaft 306 extends. Other components of the actuation system 361 are fixedly or movably coupled to the body portion 362b as discussed below.

As seen in FIGS. 3-5, the motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to, and the reduction gears 366 are rotatably coupled to the housing 302 at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362b of the actuator base 362 and radially outward of the primary output shaft 306. The shift fork 382 is generally semicircular having an inner flange 382a that extends radially inward from an inner peripheral surface of the shift fork 382. The inner flange 382a is positioned between and engages radially outwardly extending, peripheral flanges of the gear reduction hub 322, such that axial movement of the shift fork 382 moves the gear reduction hub 322 axially between the first and second positions.

The shift fork 382 also includes two followers 382b configured as rollers, each extending radially outward from the outer peripheral surface of the shift fork 382 through an axially extending slot (not shown) in the body portion 362b of the actuator base 362 to be engaged by the barrel 384 (discussed below). The axially extending slot of the body portion 362b of the actuator base 362 maintains the shift fork 382 in a constant rotational position relative to the actuator base 362, while allowing the shift fork 382 to translate axially. The two followers 382b are positioned substantially opposite each other (i.e., approximately 180 degrees apart) at, or proximate to, ends of the shift fork 382. Each follower 382b is coupled to and rotates about an axle (not labeled), which extends substantially radially outward from ends of the shift fork 382 (e.g., perpendicular to the outer peripheral surface). The shift fork 382 may additionally include a boss or protrusion for each follower 382b extending radially outward from the outer peripheral surface to which the axle is coupled.

The barrel 384 is a generally cylindrical member that surrounds the body portion 362b of the actuator base 362 and is configured to rotate thereabout to axially move the shift fork 382. The barrel 384 includes an inner peripheral surface that bears against an outer peripheral surface of the body portion 362b of the actuator base 362. One or more thrust washers 367 and/or snap clips 368 are coupled to the outer periphery of the body portion 362b at an intermediate axial location thereof, as well as adjacent the base portion 362a. As the barrel 384 rotates about the body portion 362b of the actuator base 362, edges of the barrel 384 may slide and bear against the thrust washers 367 to transfer an axial force for moving the gear reduction hub 322 relative to the actuator base 362 forward and rearward.

The barrel 384 includes an inner cam slot 384a configured to engage and axially move the shift fork 382 and, thereby, move the gear reduction hub 322 between the first and second positions. Each cam slot 384a extends radially outward from the inner peripheral surface of the barrel 384 with one of the followers 382b of the shift fork 382 being positioned in each cam slot 384a. Each cam slot 384a includes a movement region having opposed helically ramped surfaces that engage the follower 382b during the first movement stage (i.e., initial rotation of the barrel 384 and drive gear assembly 390 from center) to move the shift fork 382 axially forward and rearward. The movement region is flanked by dwell or flat regions in which the cam slot 384a maintains the follower 382b in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member 384b, which is positioned radially outward of an outer peripheral surface of the barrel 384 and extends axially rearward from a forward end of the barrel 384. The outer radial member 384b is engaged by a torsion spring 386, which transfers torque from the drive gear assembly 390 to rotate the barrel 384. More particularly, the torsion spring 386 is positioned between the outer peripheral surface of the barrel 384 and the outer radial member 384b and is wound about and bears against the outer peripheral surface of the barrel 384. The torsion spring 386 includes two ends 386a that extend radially outward to engage axially-extending edges of the outer radial member 384b and to engage the drive gear assembly 390 to transfer torque therebetween. In the case of a blocked shift event (i.e., when splines of the reduction hub 322 engage ends of splines of the input shaft 304 or planet carrier (not shown, refer to gear reduction mechanism 210 above) of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310.

The secondary torque transfer actuator mechanism 370 functions as a face cam mechanism to convert continued rotation of the drive gear assembly 390 into axial movement for operating the plate clutch 352 within the second stage of rotational movement (e.g., continued rotation from approximately ends of the first stage). The secondary torque transfer actuator mechanism 370 includes a forward member 372 (e.g., first plate or ring) and a rearward member 374 (e.g., second plate or ring), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion 362b of the actuator base 362, while the rearward member 374 is configured to both rotate and move axially relative to the forward member 372 thereby moving the actuator base 362. For example, as shown, the forward member 372 is positioned within the central bore extending through the body portion 362b of the actuator base 362 and may be coupled thereto by a press-fit, interference fit, or splined connection. The forward member 372 is positioned against a bearing member coupled to the output shaft 306 to prevent forward axial movement thereof. The rearward member 374 is configured to be rotated by the drive gear assembly 390 relative to the forward member 372, as discussed in further detail below, and is positioned to press the apply plate 352c via an intermediate bearing. The intermediate bearing allows the apply plate 352c to spin with the output shaft 306 independent of the rearward member 374, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace axially rearward to engage the apply plate 352c of the plate clutch 352 and, thereby, operate the secondary torque transfer mechanism 351. As discussed below, the drive gear assembly 390 is configured to not engage the followers 374a during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374 and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers 374a configured as rollers extending radially outward from a periphery of the rearward member 374. For example, the rearward member 374 may include two followers 374a that are positioned substantially opposite each other (i.e., approximately 180 degrees apart). Each follower 374a is coupled to and rotates about an axle (not labeled), which extends radially from the periphery of the rearward member 374 (e.g., perpendicular to an outer surface thereof). The rearward member 374 may additionally include a boss or protrusion for each follower 374a extending radially outward from the periphery of the rearward member 374 to which the axle and follower 374a are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), a hub 394, and a gear plate 396 (e.g., a second plate), which are fixedly coupled to each other to be rotated in unison by the motor 364. When the motor 364 drives the gear plate 396 by way of the reduction gears 366, the hub 394 engages the followers 374a to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362b of the actuator base 362. The drive gear assembly 390 is held axially on the actuator base 362 between one of the thrust washers 367 and an end plate coupled to the body portion 362b of the actuator base 362.

While the drive gear assembly 390 may alternatively be provided as a single component or two primary components, an assembly of the sense plate 392, the hub 394, and the gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396a and an outer periphery 396b. The primary output shaft 306, along with other components of the actuator system 361, extends through the central aperture of the gear plate 396. The outer periphery 396b of the gear plate 396 includes a plurality of teeth that mesh with mating teeth of the reduction gears 366, so as to be rotated by the motor 364. Because the actuator system 361 operates within a limited range of rotational motion in the first and second movement stages (e.g., +/−60 degrees), as described above for operating both the secondary torque transfer actuator mechanism 370 and the gear reduction actuator mechanism 380, only a portion of the outer periphery 396b (e.g., 180 degrees) may include teeth. The gear plate 396 may, for example, be made from powdered metal steel and, as discussed in further detail below, may include various features to facilitate coupling to the sense plate 392 and/or the hub 394.

The sense plate 392 is configured to be driven by the gear plate 396 for operating the gear reduction actuator mechanism 380. The sense plate 392 may also be configured with a position sensor 369 for monitoring the rotational position of the actuator system 361. The sense plate 392 is a unitary member, which generally includes a planar portion 392a with a central bore or aperture defined by an inner periphery 392b and also includes first and second annular flanges 392c, 392d, which extend forward axially from an outer periphery of the planar portion 392a. In the drive gear assembly 390, the planar portion 392a is positioned forward of and adjacent to a forward surface of the gear plate 396. The first flange 392c extends substantially circumferentially (e.g., approximately 270 degrees) about the outer periphery of the planar portion 392a. The second flange 392d is configured relative to the outer radial member 384b of the barrel 384 to transfer torque therebetween via the torsion spring 386. More particularly, the second flange 392d is positioned between the circumferential ends of the first flange 392c and has a width that is complementary to the width of the outer radial member 384b of the barrel 384, such that both the outer radial member 384b of the barrel 384 and the second flange 392d of the sense plate 392 are positioned between and engaged by the ends 386a of the torsion spring 386. The second flange 392d is additionally, positioned radially between the coil of the torsion spring 386 and the outer radial member 384b of the barrel 384. The sense plate 392 may, for example, be made from powdered metal steel, aluminum, polymers or composites, etc. and, as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370.

The hub 394 is a unitary member, which generally includes a base portion 394a (e.g., radial flange) with a central aperture, and includes an annular body 394b extending axially from an inner periphery of the base portion 394a, which rotates about and bears against the body portion 362b of the actuator base 362. As part of the drive gear assembly 390, the annular body 394b extends rearward through the central apertures of the sense plate 392 and the gear plate 396 with the sense plate 392 being held between the base portion 394a of the hub 394 and the gear plate 396. The hub 394 may, for example, be made from powdered metal steel, aluminum, polymers or composites, etc. and, as discussed in further detail below, may include various features to facilitate coupling to the sense plate 392 and/or the gear plate 396.

The hub 394 additionally defines slots 394c (e.g., cutouts) in the annular body 394b in which the followers 374a of the secondary torque transfer actuator mechanism 370 are positioned. Each slot 394c is defined between two circumferentially opposing end walls 394d (e.g., tracks) of the annular body 394b, which extend axially rearward. The slots 394c are sized equally and are circumferentially spaced according to spacing of the followers 374a to provide simultaneous engagement of the followers 374a during rotation of the drive gear assembly 390. During the first movement stage, the followers 374a each remain in a middle region of the slot 394c between the opposed end walls 394d. With continued rotation in the second movement stage, each of two end walls 394d, one from each slot 394c, simultaneously engage and apply a tangential force to one of the followers 374a to rotate the rearward member 374 of the secondary torque transfer actuator mechanism 370. With this rotation, the rearward member 374 displaces axially rearward from the forward member 372, while the followers 374a roll rearward along the opposed end walls 394d. The end walls 394d have an axial length allowing the followers 374a to travel thereon through the full range of axial displacement of the secondary torque transfer actuator mechanism 370.

As referenced above, the drive gear assembly 390 includes the sense plate 392, the hub 394, and the gear plate 396, which are fixedly coupled together to rotate in unison as a single unit. According to the embodiment shown in FIGS. 3-5, the sense plate 392, the hub 394, and the gear plate 396 are coupled together via a press-fit, splined arrangement. More particularly, the annular body 394b (e.g., inner peripheral flange) of the hub 394 is configured to be inserted into the central bore of the sense plate 392 and the central bore of the gear plate 396. The diameter of the outer surface of the annular body 394b of the hub 394 nominally has an outer diameter that is slightly smaller than the inner diameters of the inner peripheries 392b and 396a of the sense plate 392 and the gear plate 396, respectively. The annular body 394b includes a plurality of coupling splines 394j extending axially and protruding radially outward from the outer surface of the annular body 394b in one or more regions to tightly engage and couple with the inner peripheries 392b and 396a of the sense plate 392 and the gear plate 396. The coupling splines 394j may, for example, be configured to deform or cut material forming the inner peripheries 392b and 396a as the sense plate 392 and the gear plate 396 are pressed successively onto the annular body 394b of the hub 394. The annular body 394b may additionally include one or more alignment splines 394k extending axially and protruding radially outwardly from the outer surface of the annular body 394b at one or more locations to be received within alignment slots 392f and 396c of the sense plate 392 and the gear plate 396, respectively. During operation, the motor 364, by way of the reduction gears 366, engages and rotates the gear plate 396, which transfers torque to the hub 394 by way of the splined connection, which in turn transfers torque to the sense plate 392 by way of the splined connection.

Figure 6A:
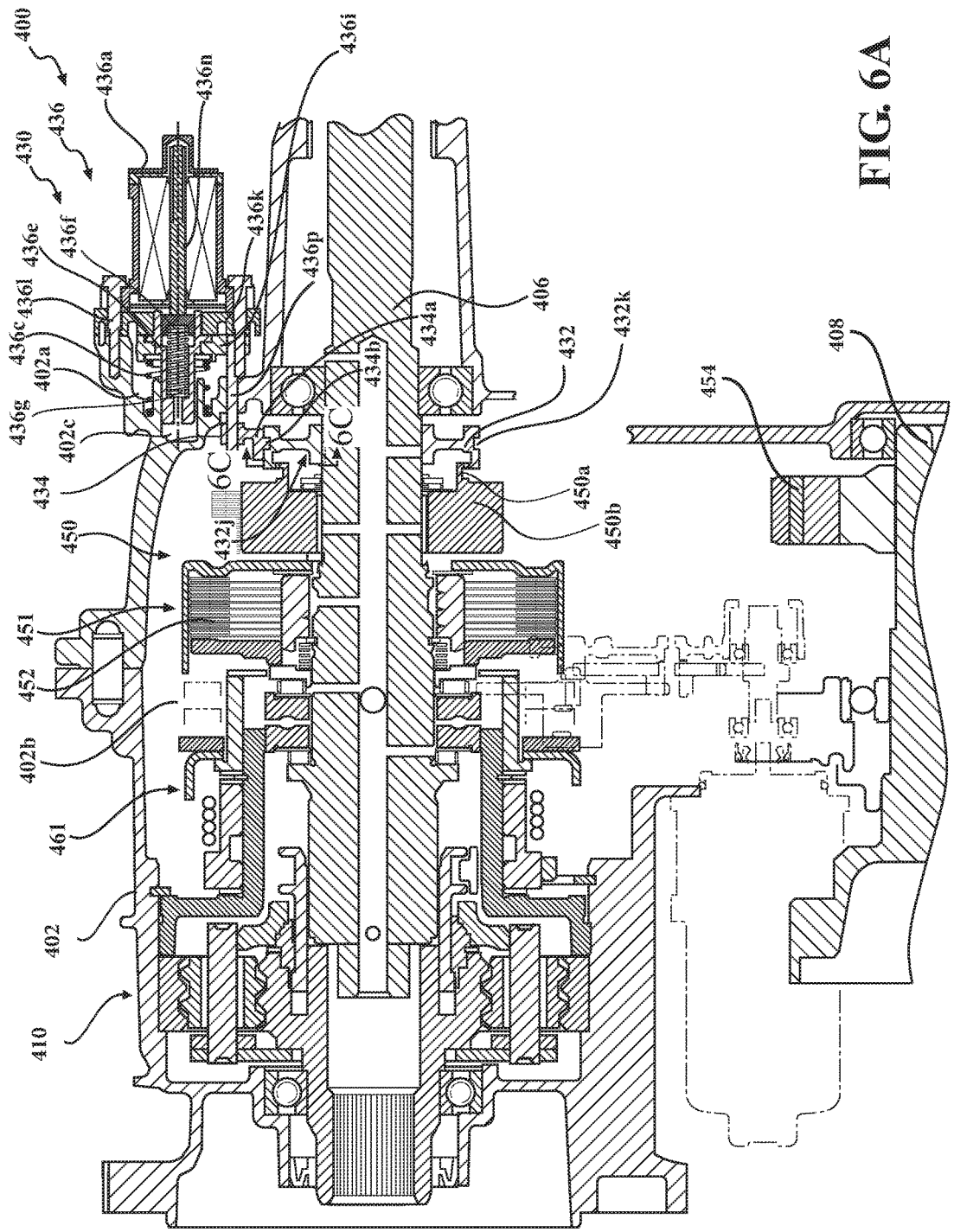
FIG. 6A is a cross-sectional view of a transfer case according to an exemplary embodiment in a first state.
Figure 6B:
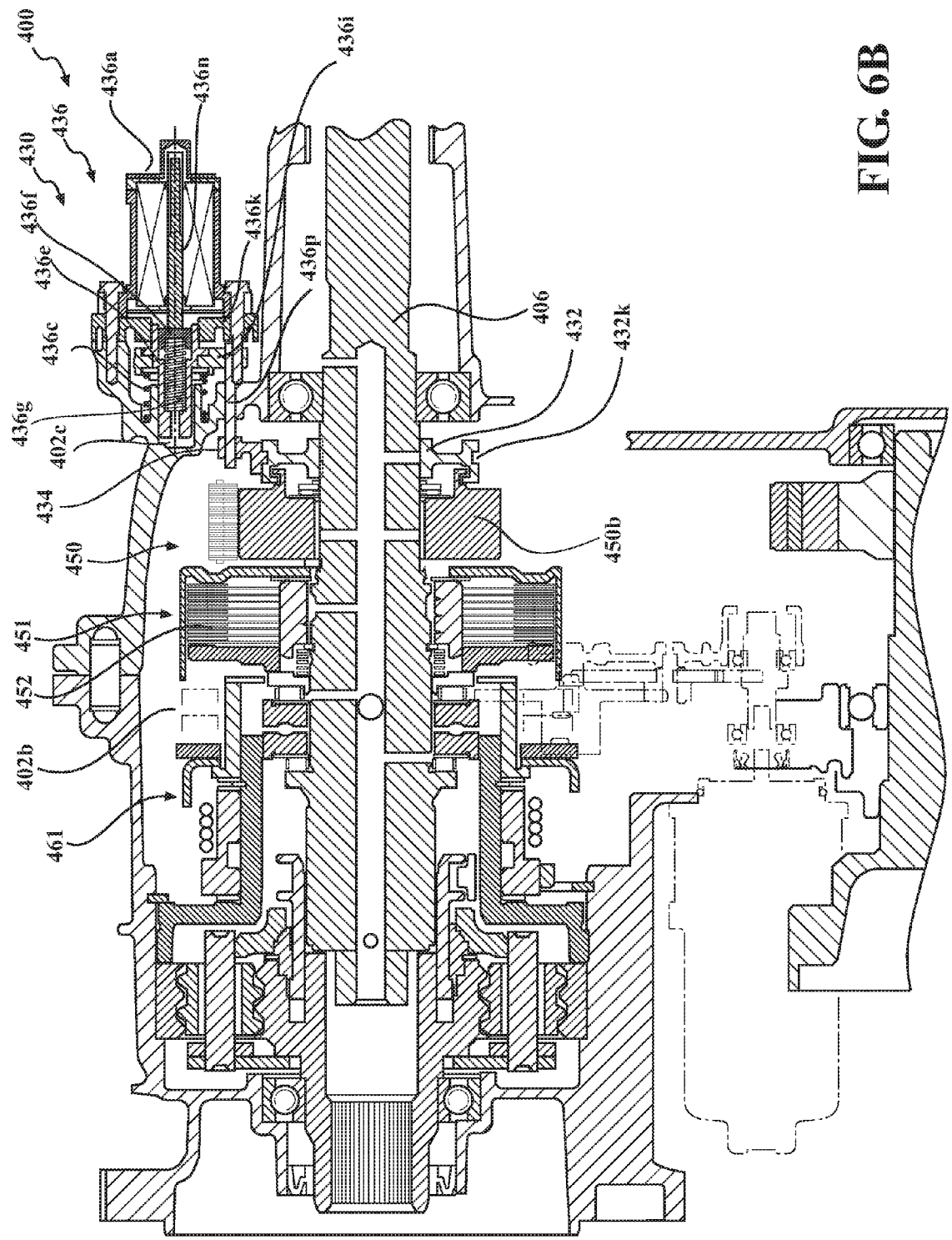
FIG. 6B is a cross-sectional view of the transfer case of FIG. 6A in a second state.
Figure 6C:
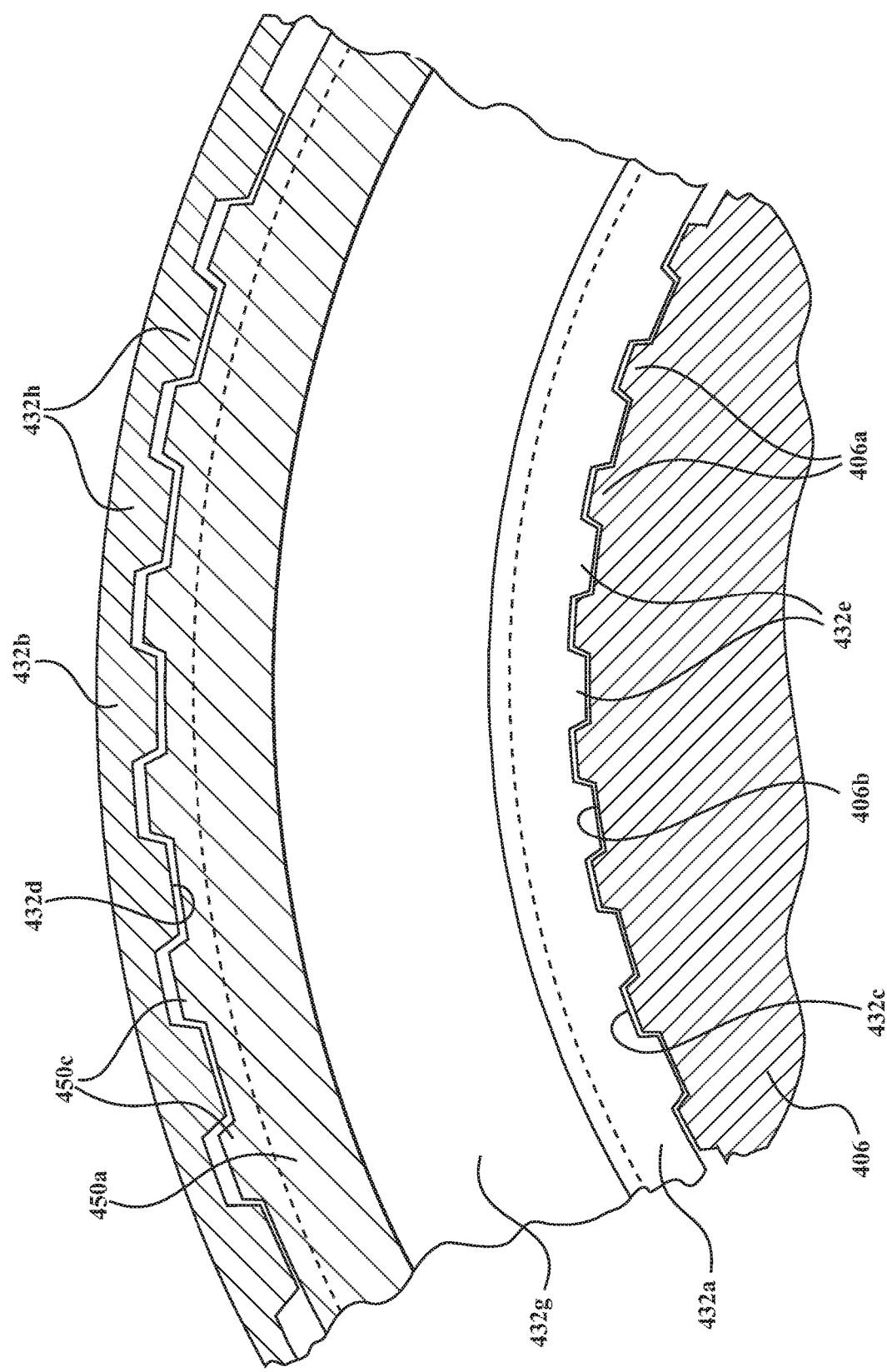
FIG. 6C is a cross-sectional view taken along line 6C-6C in FIG. 6A.

According to the exemplary embodiment shown in FIGS. 6A-6C, a transfer case 400 is configured substantially similar to the transfer case 300. Systems, mechanisms, and components having like structure and/or function are generally referred to with reference numerals increasing by 100 (i.e., 400 as opposed to 300). More particularly, the transfer case 400 includes a gear reduction mechanism 410 and secondary torque transfer mechanism 451, which are operated in first and second stages of an actuation system 461, as described for the transfer case 300. The secondary torque transfer mechanism 451, however, additionally includes a secondary torque locking mechanism 430 configured to positively couple or lock the transfer case 400 into four-wheel drive operation by selectively forming a positive coupling or connection (e.g., lock) between a primary output shaft 406 and a secondary output shaft 408, as opposed to a frictional coupling achieved through conventional operation of a plate clutch 452. For example, a primary sprocket 450 is selectively coupleable to the primary output shaft 406 with the secondary torque locking mechanism 430 and is further coupled to a secondary sprocket 454 with a chain (not labeled), which is in turned coupled to the secondary output shaft 408. The secondary torque locking mechanism 430 functions as a secondary or alternative means to conventional operation of the plate clutch 452 for coupling the primary output shaft 406 to the secondary output shaft 408 and transferring torque therebetween, or may be the primary or only means for transferring torque between the primary output shaft 406 and the secondary output shaft 408. While the secondary torque locking mechanism 430 is described below with reference to the transfer case 400, which is configured similar to the transfer case 300, the secondary torque locking mechanism 430 may be incorporated in transfer cases having other designs (e.g., transfer case 200, without actuation system 461, etc.).

The secondary torque locking mechanism 430 generally includes a locking sleeve 432 (e.g., ring, collar, or hub), a fork 434 (e.g., shift fork, fork member), and an actuator system 436. The locking sleeve 432 selectively, positively couples the primary output shaft 406 to the sprocket 450 to transfer torque therebetween and ultimately to the secondary output shaft 408. The fork 434 and the locking actuator system 436 move the locking sleeve 432 between positions in which the locking sleeve 432 does and does not positively couple the first sprocket 450 to the primary output shaft 406.

The locking sleeve 432 (e.g., ring, collar, etc.) is configured as a dog clutch that selectively couples an annular portion 450a (e.g., annular sprocket portion, member, or extension) or other portion of the sprocket 450 to the primary output shaft 406. The locking sleeve 432 is a unitary member that generally includes a radially inner portion 432a (e.g., inner annular portion), a radially outer portion 432b (e.g., outer annular portion), and an intermediate portion 432g (e.g., web) extending in a radial direction between the inner portion 432a and the outer portion 432b. An inner periphery 432c of the inner portion 432a forms a splined connection with the primary output shaft 406 to transfer torque therebetween, and is configured to slide axially therealong between a rearward position (e.g., first or engaged position; FIG. 6A) and a forward position (e.g., a second or disengaged position; FIG. 6B). The splined connection between the locking sleeve 432 and the primary output shaft 406 is maintained in both the rearward and forward positions, such that the splined connection of the locking sleeve 432 to the primary output shaft 406 is non-selective. The connection between the locking sleeve 432 and the primary shaft 406 may be referred to as a sliding splined connection, which may be formed directly therebetween or via an intermediate member. Additionally, the locking sleeve 432 may be formed of two or more members that are coupled to each other.

An inner periphery 432d of the outer portion 432b of the locking sleeve 432 selectively forms a splined connection with an annular portion 450a of the sprocket 450 when the locking sleeve 432 is in the rearward position but not the forward position. Thus, in the forward position, the locking sleeve 432 is coupled to and rotates with the primary output shaft 406 but not the sprocket 450, while in the rearward position, the locking sleeve 432 is coupled to and rotates with both the primary output shaft 406 and the sprocket 450, so as to transfer torque therebetween.

As shown in FIG. 6C, the inner periphery 432c of the inner portion 432a of the locking sleeve 432 and an outer periphery 406b of the primary output shaft 406 have complementary inner and outer diameters and spline patterns, respectively, which allow receipt of the primary output shaft 406 within the inner portion 432a of the locking sleeve 432. The complementary diameters and spline patterns additionally allow for axial displacement of the locking sleeve 432 between the rearward position and the forward position by sliding along the primary output shaft 406. The inner periphery 432c of the locking sleeve 432 includes a plurality of circumferentially spaced splines 432e (e.g., teeth or ribs) that extend radially inward to define channels or slots therebetween. The splines 432e have a generally constant width and spacing measured in a circumferential direction. The primary output shaft 406 includes on its outer periphery 406b a plurality of circumferentially spaced splines 406a (e.g., teeth or ribs) that extend radially outward to define channels or slots therebetween. The splines 406a also have a generally constant width and spacing measured in a circumferential direction. In both the rearward and forward positions of the locking sleeve 432, the splines 432e of the locking sleeve 432 and the splines 406a of the primary output shaft 406 are positioned between each other to engage each other in a tangential direction to transfer torque therebetween.

The inner periphery 432d of the outer portion 432b of the locking sleeve 432 and an annular portion 450a of the sprocket 450 have complementary inner and outer diameters and spline patterns, respectively. This allows selective receipt of the annular portion 450a of the sprocket 450 within the outer portion 432b of the locking sleeve 432 when the locking sleeve 432 is moved to the rearward position. The inner periphery 432d of the outer portion 432b of the locking sleeve 432 and the annular portion 450a of the sprocket 450, for example, have larger diameters than the inner periphery 432d of the inner portion 432a of the locking sleeve 432 and the primary output shaft 406. The inner periphery 432d of the outer portion 432b of the locking sleeve 432 includes a plurality of circumferentially spaced splines 432h (e.g., teeth or ribs that extend radially inward) that define channels or slots that open radially inward therebetween.

The annular portion 450a of the sprocket 450 extends axially rearward from a main body 450b (e.g., sprocket body) of the sprocket 450, so as to be positioned generally opposite the plate clutch 452 relative to the sprocket 450. The annular portion 450a may be formed continuously with the main body 450b of the sprocket 450 or may otherwise be coupled thereto. The annular portion 450a of the sprocket 450 includes on its outer periphery a plurality of circumferentially spaced splines 450c (e.g., teeth or ribs) that extend radially outward to define channels or slots therebetween that open radially outward. When the locking sleeve 432 is in the rearward position, the splines 432h of the locking sleeve 432 and the splines 450c of the sprocket 450 are positioned between each other to engage each other in a tangential direction to transfer torque therebetween. When the locking sleeve 432 is in the forward position, the splines 432h of the locking sleeve 432 are positioned axially forward of the splines 450c of the sprocket 450 to allow independent rotation of the primary output shaft 406 and the sprocket 450. For example, the splines 432h may be positioned in a channel located between the splines 450c and the main body 450b of the sprocket 450. Alternatively, the locking sleeve 432 may be configured to move rearward, so as to disengage the sprocket 450.

Additionally, the outer portion 432b of the locking sleeve 432 is positioned axially forward of the intermediate portion 432g, thereby forming a pocket 432j (e.g., recess) radially inward of the outer portion 432b into which the annular portion 450a of the sprocket 450 may be received when the locking sleeve 432 is in or is moved to the forward position. For example, when the locking sleeve 432 is in the forward position, at least a portion of the annular portion 450a of the sprocket 450 may be positioned within the pocket 432j radially between the primary output shaft 406 and the outer portion 432b of the locking sleeve 432. The inner portion 432a of the locking sleeve 432 may also extend axially forward of the intermediate portion 432g, such that the pocket 432j extends in a radial direction between the inner portion 432a and the outer portion 432b of the locking sleeve 432.

To facilitate receipt of the splines 432e of the locking sleeve 432 and the splines 450c of the sprocket 450 between each other as the locking sleeve 432 is moved axially rearward to the rearward position, the splines 432e and the splines 450c may include or form tapered leads at axially engaging ends thereof (i.e., rearward and forward ends thereof, respectively). The splines 432e and the splines 450c have generally constant widths measured in a circumferential direction but taper or narrow toward the rearward and forward ends, thereof, respectively. The ends, thereby, have lesser width than the generally constant width of the splines 432e and 450c, so as to lessen a range of relative rotational movement between the locking sleeve 432 and the sprocket 450 in which the ends of the splines 432e and the splines 450c might directly engage each other and prevent axial receipt of each other therebetween (i.e., a blocked shift event).

The fork 434 and the actuator system 436 are configured to move the locking sleeve 432 between the rearward and forward positions to selectively, positively couple or lock the primary output shaft 406 to the sprocket 450, thereby coupling the secondary output shaft 408. The fork 434 is coupled to the locking sleeve 432 and to the actuator system 436, as discussed in further detail below. The fork 434 includes an arcuate member 434a having a radially inward flange 434b that is received within a radially outward slot or channel 432k of the locking sleeve 432. As the fork 434 is displaced axially by the actuator system 436, the inward flange 434b of the fork 434 applies an axial force against a portion of the locking sleeve 432 that defines the channel 432k. The arcuate member 434a and/or the inward flange 434b may each have a generally constant radius and circumference extending up to approximately 180 degrees about the axis of the arcuate member 434a. As the locking sleeve 432 is rotated by the primary output shaft 406, the fork 434 remains coupled to the locking sleeve 432 with the flange 434b being positioned within the channel 432k of the locking sleeve 432, as the locking sleeve 432 is rotated relative thereto.

The locking actuator system 436 is coupled to and configured to move the fork 434 and, thereby, the locking sleeve 432. The actuator system 436 includes an actuator 436a, a compressible shaft assembly coupled to the fork 434, and a return spring 436c (e.g., outer spring). As discussed in further detail below, the compressible shaft assembly generally includes an outer shaft member 436e, an inner shaft member 436f, and a spring 436g. By way of the shaft assembly and the fork 434, the actuator 436a is configured to move locking sleeve 432 to the forward position, and the return spring 436c is configured to move the locking sleeve 432 back to the rearward position.

The actuator system 436 is coupled to the housing 402 with threaded fasteners 436l and is positioned at least partly in a secondary cavity 402a of the housing 402. The secondary cavity 402a is positioned outside a primary cavity 402b of the housing 402 in which primary components or assemblies of the transfer case 400 are positioned (e.g., the gear reduction mechanism 410, the secondary torque transfer mechanism 451, the actuator system 461, etc.). For example, the compressible shaft assembly 436b and the return spring 436c may be positioned within the secondary cavity 402a and held therein with a wall member 436k (e.g., partition). The wall member 436k abuts a portion of the housing 402 surrounding the secondary cavity 402a and forms a seal therewith. The actuator 436a abuts the wall member 436k about a periphery thereof and forms a seal therewith. The fasteners 436l extend through an outer peripheral wall of the actuator 436a and the wall member 436k to threadably engage the housing 402, so as to compress the wall member 436k between the actuator 436a and the housing 402.

The actuator 436a is an electromagnetic linear actuator that moves an actuation member 436n (e.g., a pin, shaft, piston, etc.) axially between positions corresponding to the rearward position and the forward position of the locking sleeve 432. For example, the actuator 436a may be a bi-stable actuator that moves the actuation member 436n forward upon application of current in a first direction (e.g., positive or negative) and rearward upon application of current in the opposite direction, but does not move the actuation member 436n without application of current.

The compressible shaft assembly 436b allows for axial deflection between the actuator 436a and the fork 434, for example, upon occurrence of a blocked shift event (described previously). The shaft assembly 436b generally includes an outer shaft member 436e (e.g., primary shaft member), an inner shaft member 436f (e.g., secondary shaft member or button), and an inner spring 436g, which are axially aligned. A forward portion of the outer shaft member 436e slides axially within a receptacle 402c in the secondary cavity 402a of the housing 402, which is aligned generally parallel with the axis of the primary output shaft 406. A rear portion of the outer shaft member 436e slides axially within an aperture of the wall member 436k, which is axially aligned with the receptacle 402c. A circumferential flange of the outer shaft member 436e engages the wall member 436k about the aperture, so as to limit rearward axial travel of the outer shaft member 436e and retain the outer shaft member 436e within the secondary cavity 402a of the housing 402.

The outer shaft member 436e also includes a central bore in which the inner spring 436g and the inner shaft member 436f are positioned. The bore includes a forward portion having a first smaller diameter, a rear portion having a second diameter larger than the first, and a shoulder or transition region between the first and second diameters. The spring 436g is positioned in the forward portion of the bore and extends rearward into the rearward portion of the bore. The inner shaft member 436f is positioned and slides within the rear portion of the bore and has a larger diameter than the forward portion of the bore. The inner shaft member 436f also includes a forwardly open recess in which the spring 436g is positioned therein. The bore also includes a rear opening proximate (e.g., concentric with) the aperture of the wall member 436k, which provides access for the actuation member 436n to engage a rear surface of the inner shaft member 436f. While in the rearward position, the actuator 436a may be disengaged with the inner shaft member 436f, for example, being spaced apart from the rear surface thereof in an axial direction and a small distance (e.g., a few microns).

The outer shaft member 436e is coupled to the fork 434, such that the fork 434 and locking sleeve 432 move axially therewith. For example, the locking actuator system 436 includes a collar member 436i that is coupled to the outer shaft member 436e, and a pin or shaft 436p coupled to and extending between the fork 434 and the collar 436i through a wall of the housing 402 dividing the secondary cavity 402a from the primary cavity 402b. The collar member 436i is positioned around the outer shaft member 436e at a fixed axial position on the outer shaft member 436e. For example, the collar member 436i may be held between a circumferential flange of the outer shaft member 436e and a snap ring (shown; not labeled). Alternatively, the collar member 436i may be formed integrally with or otherwise coupled to the outer shaft member 436e.

To move the locking sleeve 432 forward to the second or disengaged position, a first voltage (e.g., positive) is applied to the actuator 436a, which causes the actuation member 436n to bias forward and engage the inner shaft member 436f. The inner shaft member 436f is in turn biased forward and presses the coil spring 436g forward, which in turn presses the outer shaft member 436e in a forward direction. The locking sleeve 432, by being coupled to the outer shaft member 436e by way of the collar 436i and the shaft 436p, is moved forward with the outer shaft member 436e. In the event of increased friction that prevents forward motion of the locking sleeve 432 (e.g., a torque lock condition), the inner coil spring 436g will compress until the friction reduces sufficiently to be overcome by the force of the coil spring 436g. During forward motion of the outer shaft member 436e, the outer spring 436c is compressed between the housing 402 and the outer shaft member 436e, or any intermediate component (e.g., collar member 436i, snap ring, etc.).

To move the locking sleeve 432 to the rearward position, a second voltage, opposite the first voltage (e.g., negative), is applied to the actuator 436a, which moves the actuation member 436n rearward and out of engagement with the inner shaft member 436f. This rearward movement of the actuation member 436n allows the outer spring 436c to decompress by pressing forward against the housing 402 and rearward against the outer shaft member 436e (or intermediate member) to move the outer shaft member 436e rearward and the locking sleeve 432 into engagement with the sprocket 450. Upon occurrence of a blocked shift event, the return spring 436c remains compressed until relative rotation between the locking sleeve 432 and the sprocket 450 relieves the blocked shift event, thereby allowing the spring 436g to decompress further to move the locking sleeve 432 rearward into the first or engaged position.

As described above, the secondary torque locking mechanism 430 provides a binary connection between the primary output shaft 406 and the secondary output shaft 408, not a friction coupling (e.g., progressive or slip coupling). Accordingly, the secondary torque locking mechanism 430 may be operated when the primary output shaft 406 and the secondary output shaft 408 are not rotating at different rates. For example, the secondary torque locking mechanism 430 may be operated when neither the primary output shaft 406, nor the secondary output shaft 408, are rotating, such as when a vehicle comprising the transfer case 400 is not moving. The secondary torque locking mechanism 430 may also be operated when the primary output shaft 406 and the secondary output shaft 408 are rotating at the same rate, such as when secondary torque transfer mechanism 451 has been conventionally operated (i.e., by compressing the plate clutch 452; refer to discussion of plate clutches 252, 352 above) to form a friction coupling between the primary output shaft 406 and the secondary output shaft 408. Additionally, the secondary torque locking mechanism 430 may be configured to operate only when the transfer case 400 is in either drive ratio or only one of the drive ratios (e.g., high or low; refer to discussion of gear reduction mechanism 410 above).

According to other exemplary embodiments, the secondary torque locking mechanism 430 may be configured in other manners. For example, the primary output shaft 406 or an intermediate member (e.g., a collar) may have the same diameter and/or spline pattern (e.g., spline number, spacing, width, and depth) as the annular portion 450a of the sprocket 450, such that the locking sleeve 432 has a generally constant cross-section along its axial length with the same splines of the locking sleeve 432 simultaneously engaging splines of both the sprocket 450 and the primary output shaft 406 at different axial locations. The seconday torque locking mechanism 430 may be configured to move the locking sleeve 432 rearward to disengage the sprocket 450 and forward to engage the sprocket 450. The locking sleeve 432 may also be non-selectively coupled to the sprocket 450 and selectively coupled to the primary output shaft 406 or an intermediate member (e.g., fixed collar), for example, with similar splined connections as described above.

While the disclosure has been made in connection with what is presently considered to be the most practical and preferred embodiment, it should be understood that the disclosure is intended to cover various modifications and equivalent arrangements.

The invention claimed is:

1. A transfer case comprising:
   a primary shaft;
   a secondary shaft; and
   a torque transfer mechanism configured to selectively transfer torque from the primary shaft to the secondary shaft, wherein the torque transfer mechanism includes a locking ring, a first sprocket selectively coupleable to the primary shaft with the locking ring, a second sprocket coupled to the secondary shaft, and a chain extending between the first sprocket and the second sprocket to transfer torque therebetween, the torque transfer mechanism including an actuator including a compressible shaft configured to move the locking ring between a first position, in which the locking ring is coupled to the first sprocket, and a second position, in which the locking ring is uncoupled from the first sprocket, upon the application of current in opposing directions;
   wherein the locking ring includes an inner annular portion having a first inner periphery that forms a sliding splined connection with the primary shaft, and includes an outer annular portion having a second inner periphery that selectively forms another splined connection with the first sprocket.

2. The transfer case according to claim 1, wherein the first sprocket includes a sprocket body and an annular sprocket portion that extends from the sprocket body and is fixedly coupled thereto to rotate therewith.

3. The transfer case according to claim 2, wherein the actuator moves the locking ring from the first position to the second position upon the application of either positive or negative current and moves the locking ring from the second position to the first position upon the application of the other of positive or negative current.

4. The transfer case according to claim 3, wherein the sliding splined connection is maintained with the primary shaft when the locking ring is moved between the first position and the second position.

5. The transfer case according to claim 3, wherein the second position is closer to the sprocket body than the first position.

6. The transfer case according to claim 2, wherein the annular sprocket portion is receivable between the inner annular portion and the outer annular portion of the locking ring.

7. The transfer case according to claim 1, wherein the locking ring additionally includes an intermediate portion extending radially outward from the inner annular portion to the outer annular portion.

8. The transfer case according to claim 7, wherein the locking ring defines a recess extending radially between the inner annular portion and the outer annular portion.

9. The transfer case according to claim 1, wherein the actuator is configured for linear movement.

10. A transfer case comprising:
    a primary shaft;
    a secondary shaft; and
    a torque transfer mechanism configured to selectively transfer torque from the primary shaft to the secondary shaft, wherein the torque transfer mechanism includes a locking ring, a first sprocket selectively coupleable to the primary shaft with the locking ring, a second sprocket coupled to the secondary shaft, and a chain extending between the first sprocket and the second sprocket to transfer torque therebetween, wherein the locking ring includes an inner annular portion having a first inner periphery that forms a sliding splined connection with the primary shaft, and includes an outer annular portion having a second inner periphery that selectively forms another splined connection with the first sprocket, wherein the torque transfer mechanism includes a first actuation system including a linear actuator that selectively moves the locking ring between a first position in which the locking ring is coupled to the first sprocket and a second position in which the locking ring is not coupled to the first sprocket, wherein the first actuation system additionally includes a shift fork slidingly coupled to the locking ring and a compressible shaft extending between the shift fork and the linear actuator, and wherein the linear actuator is a bi-stable actuator.

11. The transfer case according to claim 10, wherein the torque transfer mechanism includes a second actuation system having a plate clutch that selectively forms a friction coupling between the first sprocket and the second sprocket.

12. The transfer case according to claim 11, wherein the second actuation system includes a rotary actuator.

13. The transfer case according to claim 11, wherein the second actuation system is additionally configured to selectively change between drive ratios of the transfer case.

14. The transfer case according to claim 1, wherein the first sprocket includes a sprocket body and an annular sprocket portion that extends rearward from the sprocket body and is fixedly coupled thereto to rotate therewith;
wherein the locking ring is selectively movable between a first position in which the locking ring is coupled to the annular sprocket portion and a second position in which the locking ring is not coupled to the annular sprocket portion, and the locking ring additionally includes an intermediate portion extending radially outward from the inner annular portion to the outer annular portion;
wherein the torque transfer mechanism includes a first actuation system that selectively moves the locking ring between a first position in which the locking ring is coupled to the first sprocket and a second position in which the locking ring is not coupled to the first sprocket, and the first actuation system includes a linear actuator; and
wherein the torque transfer mechanism includes a second actuation system having a plate clutch that selectively forms a friction coupling between the first sprocket and the second sprocket.

15. A transfer case comprising:
a primary output shaft;
a secondary output shaft and a secondary torque transfer mechanism configured to selectively couple the secondary output shaft to the primary output shaft to transfer torque therebetween, wherein the secondary torque transfer mechanism comprises a sprocket coupled to the secondary output shaft, and a plate clutch coupled to the sprocket to selectively form a friction coupling with the primary output shaft; and
a locking mechanism configured to couple the primary output shaft to the sprocket, wherein the locking mechanism comprises a locking sleeve and an actuator including a compressible shaft, the actuator being configured to move the locking sleeve axially between a first position in which the locking sleeve forms a first splined connection with the primary output shaft and a second splined connection with the sprocket to transfer torque between the primary output shaft and the sprocket, and a second position in which the locking sleeve forms the first splined connection with the primary output shaft but does not form the second splined connection with the sprocket, the locking ring being moveable between the first and second positions upon the application of opposing current to the actuator.

16. The transfer case according to claim 15, wherein the sprocket includes an annular portion extending rearward from a body of the sprocket, and the locking sleeve includes an outer portion that selectively forms the second splined connection with the annular portion of the sprocket, and includes an inner portion that non-selectively forms the first splined connection with the primary output shaft.

17. The transfer case according to claim 16, wherein the locking sleeve forms a recess that extends radially between the outer portion and the inner portion, and the annular portion of the sprocket is received in the recess when the locking sleeve is in the second position.

18. An actuation system for a transfer case comprising:
a plate clutch configured to selectively couple a primary shaft to a secondary shaft with a friction coupling; and
a dog clutch configured to selectively couple the primary shaft to the secondary shaft with a positive coupling, the dog clutch including an annular member non-selectively coupled to the primary shaft and selectively coupleable to a sprocket to form the positive coupling upon the application of a current to an actuator mechanically connected to the annular member, the actuator including a compressible shaft.

19. The actuation system according to claim 18, wherein the dog clutch includes a locking sleeve having an outer annular portion having an inner periphery that selectively couples to the sprocket and an inner annular portion having another inner periphery that is non-selectively coupled to the primary shaft.

* * * * *